Patented Oct. 30, 1945

2,387,755

UNITED STATES PATENT OFFICE 2,387,755

HYDROGEN-MODIFIED POLYMERS OF ETHYLENE

William Edward Hanford, Easton, Pa., assignor to E. I. du Pont de Nemours & Company, Wilmington, Del., a corporation of Delaware No Drawing. Application March 4, 1943, Serial No. 478,033

6 Claims. (Cl. 260—94)

This invention relates to high molecular weight products and processes for their preparation and more particularly to polymerization products from ethylene.

Various methods have been proposed for the polymerization of olefines such as ethylene with the principal object of obtaining high molecular weight polymers for various purposes. Oil-like products of relatively low molecular weight have been made by its polymerization in the presence of boron fluoride type catalysts while tough, solid polymers have been obtained by polymerization in the presence of peroxygen-type catalysts at superatmospheric pressures. The invention of the instant case is related to processes of the latter type and particularly to the modification products thereof.

An object of the present invention is to provide a process for the preparation of modified products from monoolefinic hydrocarbons. Another object is to provide a process wherein products can be obtained having valuable properties by the polymerization of ethylene under superatmospheric pressures in the presence of hydrogen. Still another object is to provide a process for the polymerization of ethylene under elevated pressures in the presence of hydrogen, water and a peroxygen-type catalyst. A further object is to provide modified polymeric products of ethylene. Other objects and advantages of the invention will hereinafter appear.

The above and other objects of the invention are accomplished by subjecting the monoolefinic hydrocarbon and more particularly ethylene together with hydrogen to polymerization conditions at a superatmospheric temperature and pressure in the presence of polymerization inducing quantities of peroxygen-type catalysts, the reaction likewise being preferably conducted in the presence of water with or without an addition agent such, for example, as benzene, chlorobenzene or isooctane. If desired, this reaction may be conducted in the presence of other added substances which aid in the reaction, or which may react with the product obtained to give more highly modified polymers.

The hydrogen may be employed in amounts ranging from 0.1 to 10% by weight of the ethylene used. It has been found that hydrogen performs a peculiar function during the reaction for if it be present in the amounts above indicated and preferably in amounts ranging from 0.5 to 2.5%, a semi-soft, paste-like, polymeric product is obtained surprisingly different from the product produced in the absence of hydrogen which is a hard tough product. As the percentage of hydrogen increases up to 10% the above characteristic changes become more pronounced.

The peroxygen-type catalyst which may be employed in the reaction may be present with respect to the olefine in amounts ranging from 5 to 2,000 P. P. M. (calculated as molecular oxygen). While oxygen is a very effective catalyst other peroxygen-type catalysts may be used with or without oxygen such catalysts including hydrogen peroxide, persuccinic acid, diethyl peroxide, lauroyl peroxide, tetralin peroxide, urea peroxide, butyryl peroxide, benzoyl peroxide, alkali metal and alkaline earth metal and ammonium persulfates, perborates, percarbonates and the like. These catalysts are used in amounts ranging from 0.0005 to 5.0% by weight of the ethylene.

The ethylene employed for the reaction should be free from large amounts of oxygen for it should not contain appreciably more than 5000 parts of oxygen per million parts of ethylene. Oxygen may be added to pure ethylene during the reaction. If oxygen is to be used solely as the catalyst from 30 to 50 P. P. M. is usually sufficient and if other peroxygen-type catalysts are employed, ethylene can be used containing smaller amounts of oxygen.

As has been stated the reaction is preferably carried on in the presence of water with or without addition agents such as benzene, chlorobenzene or isooctane and for best operation it has been found that the water should be present in amounts ranging from 1 to 6 parts thereof per part of the ethylene whereas the use of an addition agent such as benzene should fall, preferably, within the range of 0.1 to 0.5 part per part of ethylene.

The invention is not limited solely to the polymerization of ethylene, or other hydrocarbon containing a single ethylenic linkage, and hydrogen in the absence of other reactants, for the reaction may likewise be effected in the presence of compounds that will interpolymerize with ethylene such as the unsaturated compounds: propylene, isobutylene, styrene, the vinyl esters, such as vinyl acetate, vinyl formate, and vinyl isobutyrate as well as such acids as acrylic, methacrylic, itaconic, crotonic, and fumaric as well as their esters, acid halides, amides, and anhydrides. Other compounds which may be interpolymerized with ethylene under these conditions include the vinyl compounds such as vinyl chloride and vinylidene chloride; vinyl cyanide, vinyl ethers, divinyl formal, divinyl butyral and methyl vinyl ketone. Ethylene in the presence of hydrogen may likewise be polymerized in the presence of a number of compounds such, for example, as the halogenated aliphatic hydrocarbons, the saturated and unsaturated aliphatic and aromatic acids, esters, anhydrides, aldehydes, alcohols and ethers.

For rapid polymerization, it is desirable to provide intimate contact between all of the reactants and this may be accomplished by rapid agitation or by passing the gases through a reaction tube at such a velocity that fluids within the tube are under conditions that give turbulent flow. Other means may be employed such, for example, as by rapid stirring, atomization, shaking, bubbling of the gas or gases through a liquid or any other suitable means.

The invention is conducted at pressures ranging from 50 to 3000 atmospheres or higher, the limiting factor being the strength of the apparatus and not the characteristics of the process, and preferably the reaction is carried on between 800 and 1500 atmospheres. The temperature of the reaction may be as low as 40° C. with the highly active peroxide catalysts while with the lesser active catalysts such as molecular oxygen or air temperatures between 100 and 400° C. are used.

The following examples illustrate preferred embodiments of the invention in which parts are by weight unless otherwise indicated.

*Example 1.*—Into a pressure resisting stainless steel tube of approximately ⅟₁₆" internal diameter and 40' in length, ethylene containing 1% hydrogen was continuously passed, together with preheated water (containing oxygen to give 382 P. P. M. based on the ethylene) at the rate of 2.16 liters per hour and benzene was introduced simultaneously at the rate of 270 cc. per hour. The reaction was conducted at a temperature of approximately 200° C. and a pressure of 1000 atmospheres. A modified polymer of ethylene was obtained in a conversion of 13.1%. The product had a melt viscosity of 4 grams per minute, a tensile strength at cold draw of 1050 lbs. per sq. inch, at break of 1050 lbs. per sq. inch, a percent elongation of 125, and a softening point of 69.5° C. The melt viscosity and melting point were determined by the following procedures:

An aluminum cylinder of ⅜" internal diameter open at the top is fitted at the bottom with an 8 mm. steel disk containing at its center a 2.1 mm. orifice. The cylinder and disk are heated to a temperature of 190° C. the product to be tested, introduced, and heated to the same temperature. Above the surface of the product a piston heated to 190° C. and ⅓" in diameter is superimposed and upon it a weight is placed giving a combined weight of 2.16 kilograms. The weight of product flowing from the orifice in grams per minute is the measure of the melt viscosity.

The softening point is determined by the penetration of a needle having a blunt point with a cross sectional area of one mm. A one kilogram weight is placed on the needle. The sample being tested is heated at a rate of 50° C. per hour and the reported temperature is the temperature at which the needle penetrates to a depth of 1 cm.

*Example 2.*—The process described under Example 1 was repeated using ethylene prepared by the dehydration of ethanol, which ethylene contained approximately 0.25% hydrogen. Water (containing oxygen to give 390 P. P. M. based on the ethylene) was introduced at the rate of 2.31 liters per hour and benzene at the rate of 246 cc. per hour. The reaction was conducted at a temperature of 199° C., a pressure of 1000 atmospheres and with a contact time of 3.1 minutes, the product was obtained in a conversion of 5.7%. This product had a melt viscosity of 2 grams/minute a tensile strength at cold draw of 1200 lbs. per sq. in. and at break of 1200 lbs. per sq. inch, a percent elongation of 188 and a softening point of 79° C.

*Example 3.*—The process described under Example 1 was repeated using ethylene prepared by the dehydration of ethanol, which ethylene contained approximately .78% hydrogen. Water (containing oxygen to give 575 P. P. M. based on the ethylene) was introduced at the rate of 2.35 liters per hour and benzene at the rate of 264 cc. per hour. The reaction was conducted at a temperature of 197° C. under a pressure of 1000 atmospheres and with a contact time of three minutes, the product was obtained in a conversion of 15.1%, had a melt viscosity which was too low to measure, a tensile strength at cold draw of 1150 lbs. per sq. in. and at break of 1150 lbs. per sq. inch, with a percent elongation of 75, and a softening point of 57° C.

*Example 4.*—A stainless steel-lined pressure reaction vessel is charged with 0.2 part of benzoyl peroxide. The vessel is closed, evacuated, and pressured to about 6.7 atmospheres with hydrogen at 25° C. The vessel is placed in a shaker machine, pressured with ethylene to 600 atmospheres at 25° C., and heating and agitation are started. During a reaction time of 15.75 hours, throughout which the temperature is maintained at 73 to 76° C. and the pressure at 880 to 950 atmospheres, there is a total observed pressure drop of 90 atmospheres. The vessel is cooled, bled of excess gas, and the contents discharged. There is thus obtained 8 parts of a hydrogen modified ethylene polymer which has an intrinsic viscosity of 0.49 (as measured on a 0.5% solution in xylene at 85° C.). The product is very hard and has high surface luster.

The reaction may be carried out in accord with the invention in any suitable type of converter capable of withstanding the high pressures and it is preferably conducted in one having relatively great length to cross section.

The products are especially useful for domestic wax uses in the preparation of shoe, floor, furniture polishes and the like. They are likewise applicable to many specialized uses in which the natural mineral and vegetable waxes are employed.

I claim:

1. A process for the preparation of hydrogen modified polymers of ethylene which comprises passing a gaseous mixture of ethylene containing 0.2 to 10% hydrogen at a temperature above 40° C., a pressure above 50 atmospheres and in the presence of a catalyst selected from the group consisting of peroxy compounds and oxygen into a high pressure resisting reaction zone.

2. A process for the preparation of hydrogen modified polymers of ethylene which comprises subjecting a gaseous mixture of ethylene containing from 0.5 to 2.5% hydrogen to a temperature between 40 and 400° C. and a pressure between 800 and 1500 atmospheres in the presence of a peroxide catalyst.

3. A process for the preparation of hydrogen modified polymers of ethylene which comprises subjecting ethylene containing 1% hydrogen together with water, benzene, and a peroxide catalyst to a temperature between 100 and 400° C. and a pressure between 800 and 1500 atmospheres.

4. A process for the preparation of hydrogen modified polymers of ethylene which comprises subjecting ethylene containing from 0.5 to 2½% hydrogen and 5 to 500 P. P. M. of oxygen together with from 1 to 6 parts of water per part of ethylene to a temperature of approximately 200° C. and a pressure of 1000 atmospheres.

5. A process for the preparation of hydrogen modified polymers of ethylene which comprises polymerizing ethylene in the presence of 0.1 to 10% of hydrogen by weight of ethylene at a temperature above 40° C., a pressure above 50 atmospheres, and in the presence of a catalyst selected from the group consisting of peroxy compounds and oxygen.

6. The product obtained in accord with the process of claim 5.

WILLIAM EDWARD HANFORD.